United States Patent
Kapich

[11] Patent Number: 5,421,310
[45] Date of Patent: Jun. 6, 1995

[54] HYDRAULIC SUPERCHARGING SYSTEM

[76] Inventor: Davorin Kapich, 3111 Serrano Dr., Carlsbad, Calif. 92009

[21] Appl. No.: 214,226

[22] Filed: Mar. 17, 1994

Related U.S. Application Data

[63] Continuation-in-part of Ser. No. 104,196, Aug. 10, 1993, Pat. No. 5,346,364, which is a continuation-in-part of Ser. No. 890,370, May 26, 1992, Pat. No. 5,236,305, which is a continuation of Ser. No. 655,575, Dec. 24, 1990, abandoned.

[51] Int. Cl.$^6$ .............................................. F02B 33/40
[52] U.S. Cl. ..................................... 123/565; 123/561; 417/409
[58] Field of Search ..................... 123/559, 561, 565; 60/607, 608; 415/200, 202; 416/241 A; 417/407, 408, 409

[56] References Cited

U.S. PATENT DOCUMENTS

| | | | |
|---|---|---|---|
| 2,968,914 | 1/1961 | Birmann | 60/608 |
| 3,846,983 | 11/1974 | Freedy et al. | 123/559.1 |
| 4,285,200 | 8/1981 | Byrne et al. | 60/607 |
| 4,610,235 | 9/1986 | Grunig | 123/565 |
| 5,013,214 | 5/1991 | Kapich | |
| 5,236,305 | 8/1993 | Kapich | 415/202 |
| 5,346,364 | 9/1994 | Kapich | 415/202 |

FOREIGN PATENT DOCUMENTS

| | | | |
|---|---|---|---|
| 30660 | 4/1926 | France | 123/561 |
| 3008181 | 9/1981 | Germany | 60/608 |

*Primary Examiner*—Michael Koczo
*Attorney, Agent, or Firm*—John R. Ross

[57] ABSTRACT

A hydraulic system for driving a small, compact, relatively low cost, long life and very high speed hydraulic turbine drive. The system maximizes energy conversion efficiency between a combustion engine hydraulic pump and a high speed hydraulic turbine driven supercharger. A venturi system provides a pressure drop permitting lubrication flow for the supercharger bearings and also a substantial hydraulic pump inlet pressure to prevent foaming and cavitation at the pump inlet. A bypass valve permits control of the turbine speed based on engine need rather than engine speed as is the case with prior systems. Embodiments applicable to one stage supercharger and supercharger-turbocharger combinations are described. In a preferred embodiment of the present invention the hydraulic system is used to drive a high speed turbine at a power level in the range of 5 to 20 horsepower with operating speeds of 50,000 to 200,000 RPM. In this particular embodiment the turbine blades are produced at low cost as a part of a thermoplastic turbine wheel and the strength needed for very high centrifugal forces is provided by compressing substantially all of the plastic turbine wheel, except for the blades, within a metal sleeve.

8 Claims, 6 Drawing Sheets

HYDRAULIC SUPERCHARGING SYSTEM

This is a Continuation-In-Part Application of patent application No. 08/104,196 filed Aug. 10, 1993, U.S. Pat. No. 5,346,364, which was a continuation in part of Ser. No. 07/890,370, filed May 26, 1992, U.S. Pat. No. 5,236,305, which was a continuation of patent application No. 07/655,575, filed Dec. 24, 1990, abandoned. This invention relates to hydraulic systems and especially to hydraulic systems for high velocity hydraulic turbine drives.

BACKGROUND OF THE INVENTION

High speed rotating apparatuses are often driven by electric motors or internal combustion engines. Superchargers are a high speed device which is typically driven directly by an internal combustion engine. In such cases a speed increasing gear box or belt drive is needed. Such superchargers are limited to a relatively low rotating speed and are large in size. Paxton Blowers and Vortech Engineering Co. are marketing such superchargers. Fixed gear ratio superchargers suffer from two very undesirable features which are: 1) there is a sharp decrease in boost pressure at low engine RPM because boost pressure goes to the square of the speed of rotation, and 2) it is generally not feasible to disconnect the blower from the engine when the supercharger is not needed.

There is a great need in the engine industry for efficient hydraulic systems for driving compact, light weight superchargers. According to an article at page 27 of the August 1993 issue of Popular Science, Miller cycle engines, developed by Mazda "requires a compact, high-efficiency air compressor-conventional turbochargers and superchargers just can't generate the volume of air required". The article further states, "Mazda teamed with heavy equipment manufacturer Ishikawajima-Harima Heavy Industries Co. to develop a belt driven, screw-type compressor supercharger. The new supercharger is expensive, which is one reason Mazda doesn't plan to use the Miller-cycle engine in small cars. Lean-burn technology makes more sense there."

It is known that low pressure at hydraulic pump inlets can cause cavitation and foaming which can lead to lower efficiencies and shorten pump life.

Turbochargers of many designs are driven by engine exhaust. One such model is Model To 4B 3S supplied by Turbonetics Inc. This unit produces a compressor ratio (output pressure/atmospheric pressure) of 1.52. The various parts of this unit can be purchased separately from Turbonetics as listed in its catalog.

Gear driven and belt driven oil pumps are commercially available in the 10 to 20 HP range for producing oil pressures in the range of 1,000 to 2,500 PSIG at flows of 20 to 40 GPM.

The Applicant has been issued a U.S. Pat. No. 5,013,214 for a high speed water driven fan. Disclosed in the specification was a turbine which produced 4 horsepower at 10,000 RPM. The specification referred to and provided guidance for increased horsepower designs and higher RPM's. The hydraulic design of the present invention is based on extensive tests of the Applicant's high speed water turbine driven high velocity fan with water pressure differentials of up to 450 psi and generating 19.6 HP at 14,250 RPM. Relatively low stress levels and low operating temperature of the reference fan turbine wheel has allowed for the 2.07 inch diameter wheel to be made entirely of Delrin type plastic.

It is known that plastic turbines are generally less expensive to produce than metal turbines, but at very high rotating speeds and high temperatures plastic turbines do not have sufficient strength to provide reliable performance. For very small steel turbine wheels, standard milling procedures are not feasible and electro discharge machining is typically utilized which is very expensive. Typical production costs of making a 0.80 inch diameter turbine wheel with 34 blades is on the order of $300. Sintering is another possibility, but its tooling costs and development risks would be very high.

Utilization of high temperature thermoplastics to make very high speed turbine wheels would lower the cost significantly since the blades could be milled with conventional techniques, but the combined effects of high centrifugal stresses and high oil temperatures would cause the plastic to deform and creep with time, especially in the hub area where precision fit between the shaft and the wheel bore is required at all times.

It is known that a significant advantage of superchargers over turbochargers is that the superchargers respond immediately to increased engine power whereas turbochargers tend to lag on acceleration. Superchargers driven by an oversized oil pump can actually anticipate increased demand for engine power by controlling the oil pressure to react with the accelerator. For motor vehicle superchargers high turbine efficiencies, low cost and long life expectancies are all of paramount importance.

SUMMARY OF THE INVENTION

The present invention provides a hydraulic system for driving a small, compact, relatively low cost, long life and very high speed hydraulic turbine drive. The system maximizes energy conversion efficiency between a combustion engine driven hydraulic pump and a high speed hydraulic turbine driven supercharger. A venturi system provides a pressure drop permitting lubrication flow for the supercharger bearings and also a substantial hydraulic pump inlet pressure to prevent foaming and cavitation at the pump inlet. A bypass valve permits control of the turbine speed based on engine need rather than engine speed as is the case with prior systems. Embodiments applicable to one stage supercharger and supercharger-turbocharger combinations are described.

In a preferred embodiment of the present invention the hydraulic system is used to drive a high speed turbine at a power level in the range of 5 to 20 horsepower with operating speeds of 50,000 to 200,000 RPM. In this particular embodiment the turbine blades are produced at low cost as a part of a thermoplastic turbine wheel and the strength needed for very high centrifugal forces is provided by compressing substantially all of the plastic turbine wheel, except for the blades, within a metal sleeve.

DETAILED DESCRIPTION OF PREFERRED EMBODIMENTS

High Speed Supercharger

FIGS. 1, 2, 3 and 4 show a very high speed hydraulic driven supercharger for providing compressed air for a MAZDA RX-7 rotary engine. This supercharger is described in detail in subsequent sections of this specification. The immediately following section describes a preferred hydraulic system for driving the supercharger turbine.

Hydraulic Supercharging System

Figure 5:
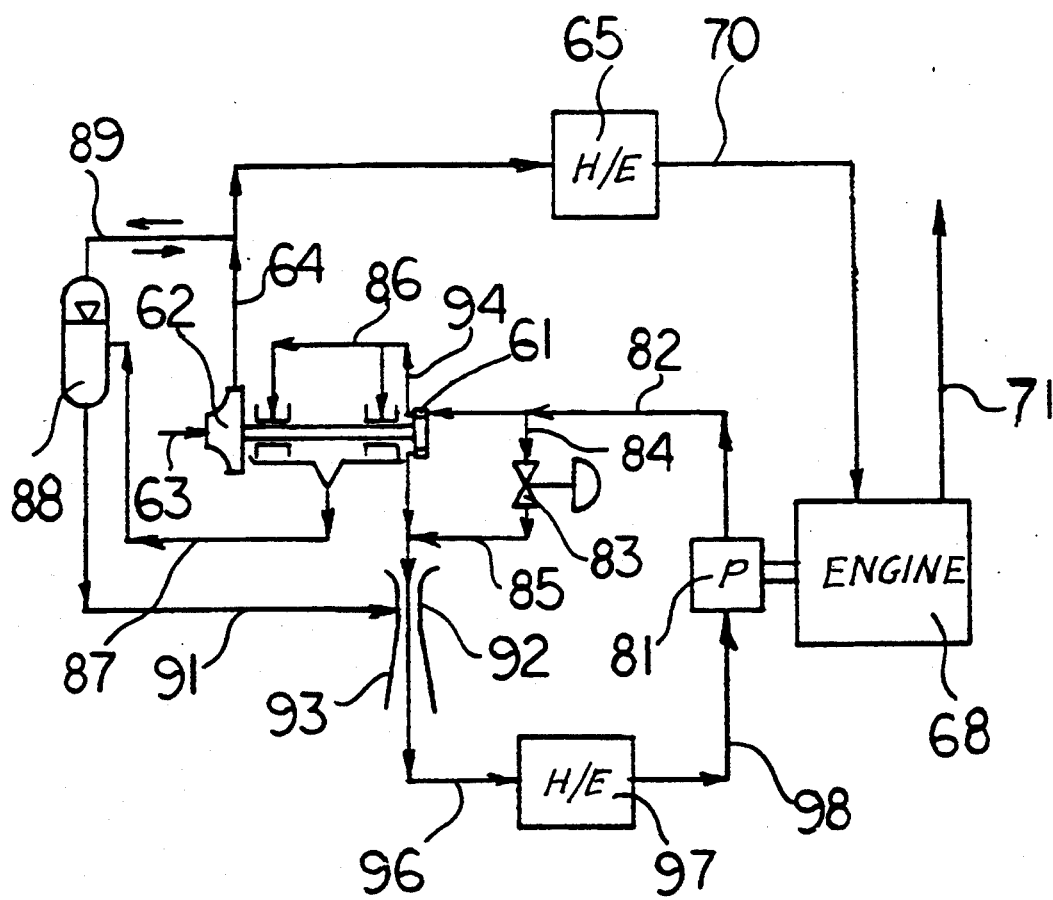
FIG. 5 is a layout of a hydraulic system according to the present invention.

FIG. 5 shows a one-stage supercharger hydraulic system. In this preferred embodiment, engine 68 is a standard Mazda RX-7 rotary engine producing useful mechanical power. Hydraulic pump 81 is driven by engine 68 and the pump is pressurizing, at the rate of about 27 gallons per minute, hydraulic fluid to a pressure of approximately 1000 psi into line 82 which channels the hydraulic fluid to turbine drive 8 and via line 84 to bypass valve 83. Hydraulic pump 81 is a commercially available hydraulic pump such as Parker Model H77. Supercharger compressor wheel 62 is a standard commercially available TO-4 compressor which is driven by turbine wheel 61 as shown in FIG. 5. When requiring maximum power from the supercharger 62, the bypass valve 83 closes to force all the hydraulic fluid to flow through turbine wheel 61. Conversely when requiring little or no supercharging power, bypass valve 83 may be fully open, minimizing the flow through turbine wheel 61 and essentially unloading hydraulic pump 81. Depending on a particular application, bypass valve 83 can be controlled manually or can be controlled automatically by an engine control system.

Turbine discharge line 94 is connected to bypass valve discharge line 85. The amount of flow from turbine wheel 61 discharge is reduced by the bearing lubricant flow of approximately 1.5 GPM which flows through line 86. The combined flow from the bypass valve 83 discharge and turbine wheel 61 net discharge flow are forced to flow through throat 92 of venturi nozzle 93. Throat 92 diameter is sized to provide a drop in static pressure at the throat 92 location of about 60 psi. This location serves as the return point for the lubricant flow supplied to supercharger bearings via line 86. The bearings drain line 87 is connected to expansion tank 88 which provides for thermal expansion of the hydraulic fluid and as a degassing point for the hydraulic fluid. The expansion tank is further connected via line 91 to throat 92. Bearing lubricant flow from line 91 joins at that point the combined turbine discharge and bypass valve discharge flows, flowing further through the diffuser section of venturi nozzle 93 where about 80 percent of the throat 92 dynamic head of 60 psi is recovered, thus raising the static pressure in line 96 to about 50 psi above throat 92 static pressure. A commercially available venturi has been converted for the above purpose. It can be purchased from Granger Company as Part No. 2P430.

Expansion tank 88 is vented into supercharger discharge line 64 which pressurizes expansion tank 88 to supercharger discharge line 64 pressure. In turn, the expansion tank pressure being essentially at throat 92 pressure, sets the pressure levels for the entire system by providing line 96 with supercharger discharge pressure of about 10 psi plus about 50 psi pressure recovered in the diffuser section of venturi nozzle 93. The hydraulic fluid flows from line 96 into oil cooler 97 where the heat losses are rejected to ambient. Hydraulic fluid flows further via line 98 at a pressure of about 60 psi back into hydraulic pump 81. The hydraulic pressure loss of about 10 psi in the diffuser section of venturi nozzle 93 constitutes a loss of about 1 percent of 1000 psi pump pressure which in turn equals about 0.1 of 1 percent of total engine power.

However, the impact of the additional net boost in power (considering pump and turbine efficiencies) due to the added air provided by the supercharger is about 50 percent. Thus, for example, the supercharger would boosts the engine power of a 100 HP MAZDA up to about 150 HP. A similar boost at full speed could be provided by a direct drive supercharger, but at low speeds (for example ⅓ speed) a supercharger according to the present invention continues to boost at about 50 percent whereas the boost provided by the direct drive model is only about 10 percent.

Pressurized air flowing through line 64 is typically aftercooled in the air to air aftercooler 65 where large amount of heat of compression is rejected to ambient. Relatively cool pressurized air is further charged into engine 68. Line 71 is the engine exhaust pipe.

A very important advantage of the present invention over direct drive superchargers is that the supercharger compressed air flow and pressure in the present system can be controlled independent of engine speed. This is simply done by adjusting the bypass flow through valve 83. This permits much higher power at low speeds for motor vehicles and permits easy compensation for altitude changes in airplane engines.

Figure 6:
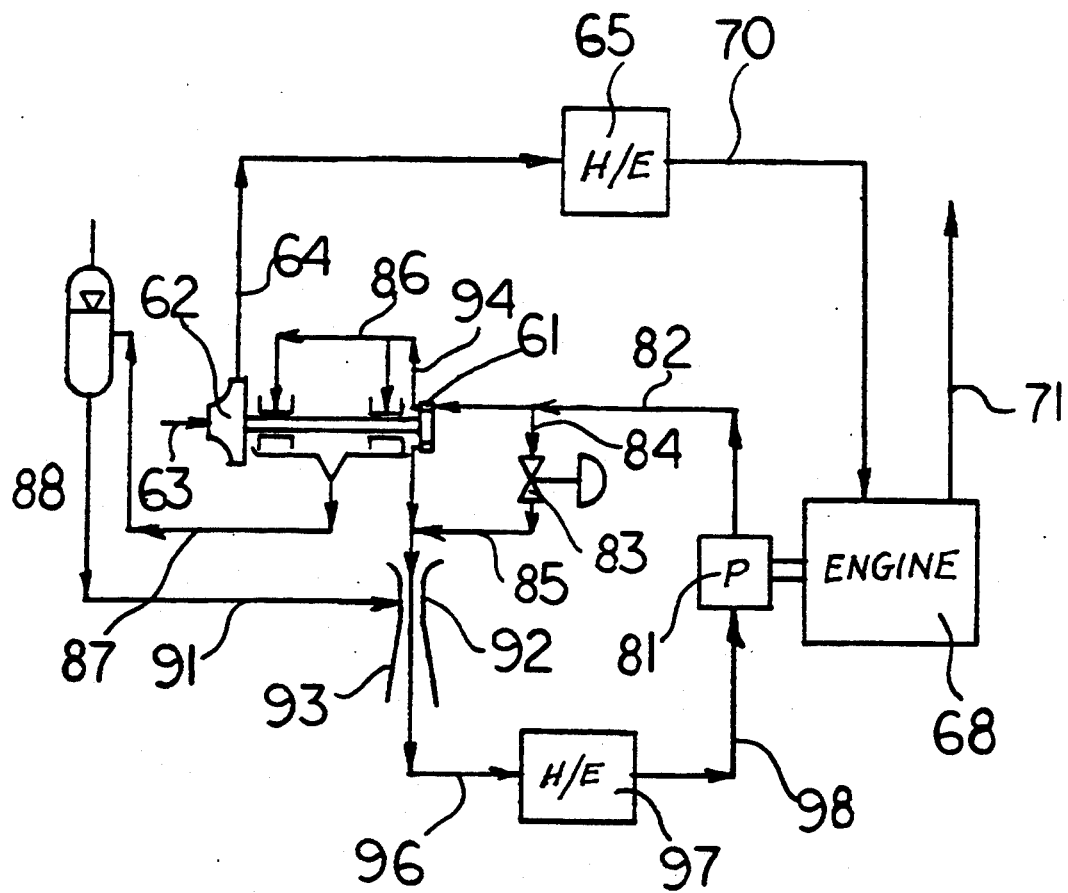
FIG. 6 is a modified version of FIG. 5.

In some instances where simplification of the overall system is desired, the expansion tank 88 may be vented directly to the atmosphere. FIG. 6 shows such a configuration.

Figure 7:
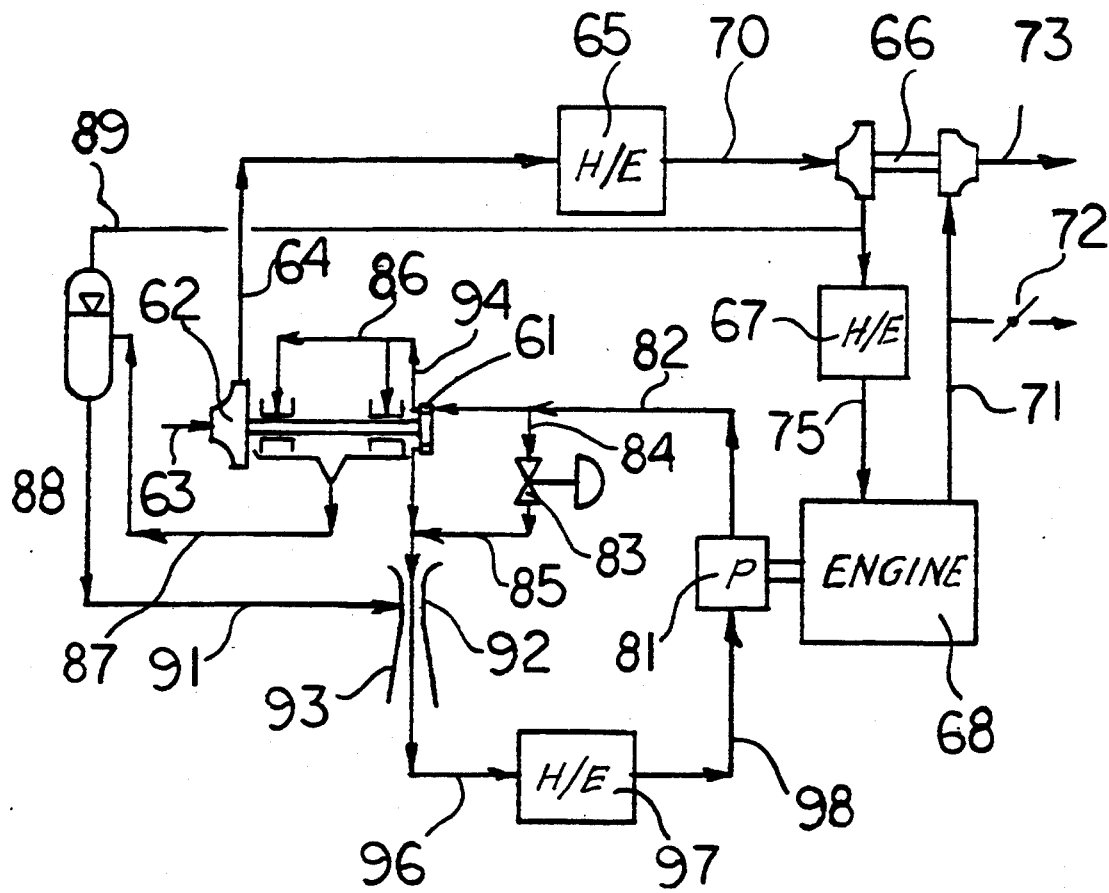
FIG. 7 is a layout similar to FIG. 5 including a turbocharger.

When multi-stage supercharging is desirable, such as in aircraft engine applications or in the case of high output engines, the expansion or in the case of high output engines, the expansion tank 88 can be vented into the discharge of the last stage supercharger. This will assure in the case of aircraft applications adequate hydraulic pump inlet pressurization even at higher altitudes. FIG. 7 shows such a case utilizing supercharger and turbocharger is series where line 89 is connected to the discharge line out of turbocharger 66. Second aftercooler 67 supplies cooled compressed air via line 75 into engine 68. Exhaust pipe 71 provides the turbine section of the turbocharger 66 with pressurized exhaust flow which after exiting turbocharger 66 turbine section flows further through line 73 to ambient or to another turbine or heat exchanger. Valve 72 provides for turbocharger 76 control to prevent overboosting engine 68.

Drive for Supercharger

Figure 2:
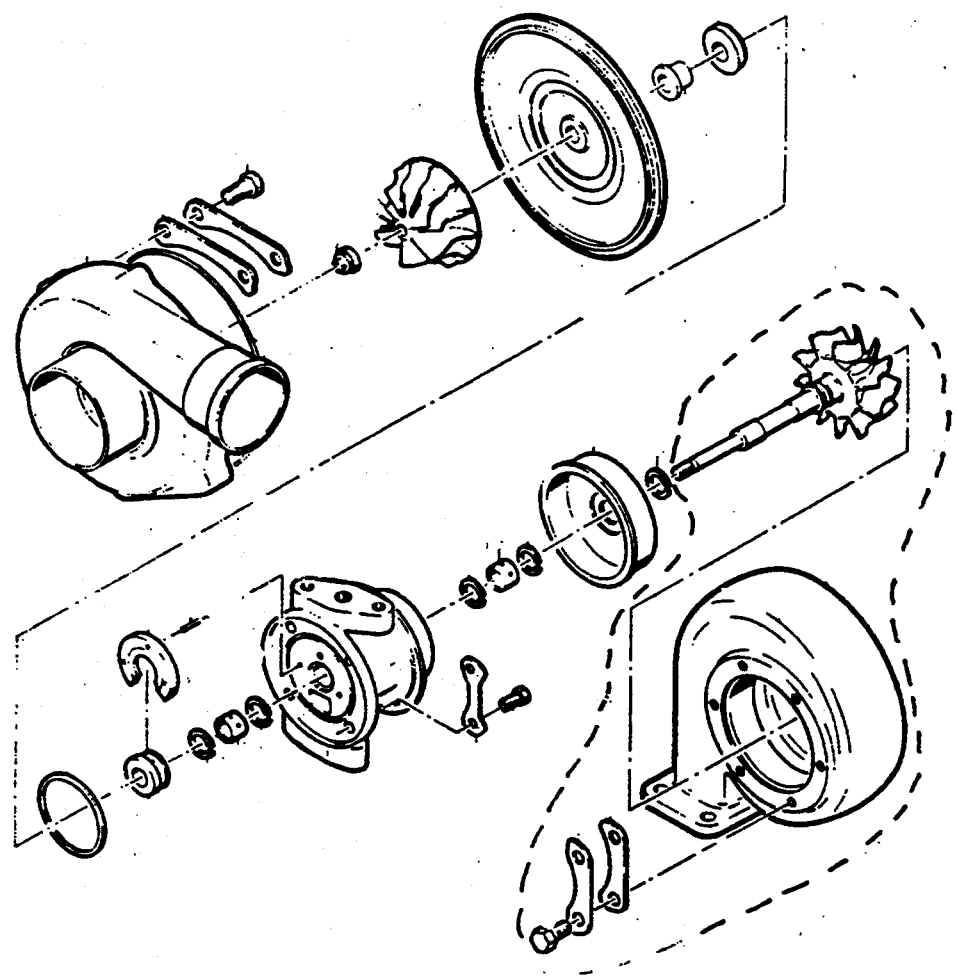
FIG. 2 is a drawing showing an exploded view of a prior art turbocharger.

The turbine described in detail herein is designed for use with the compressor and bearing assembly portion of the TO4B turbocharger, sold by Turbonetics Incorporated, 650 Flinn Avenue, Unit 6, Moorpark, Calif. A drawing of this model is shown in FIG. 2. The dashed line in FIG. 2 encircles the parts not used in a preferred embodiment of the present invention. The parts I use are individually available from the Turbonetics catalogs.

The preferred embodiment of the present invention provides a very high speed hydraulic turbine driven supercharger. The supercharger comprises a turbine wheel which achieves the low cost advantage of small plastic turbines with the strength, higher temperature and durability advantages of steel by combining the two materials in a novel fashion. The blades of the turbine wheel are made of high strength thermoplastic material, Polysulfone and it is shrunk fitted within a wheel hub of steel.

Turbine Wheel

Figure 1:
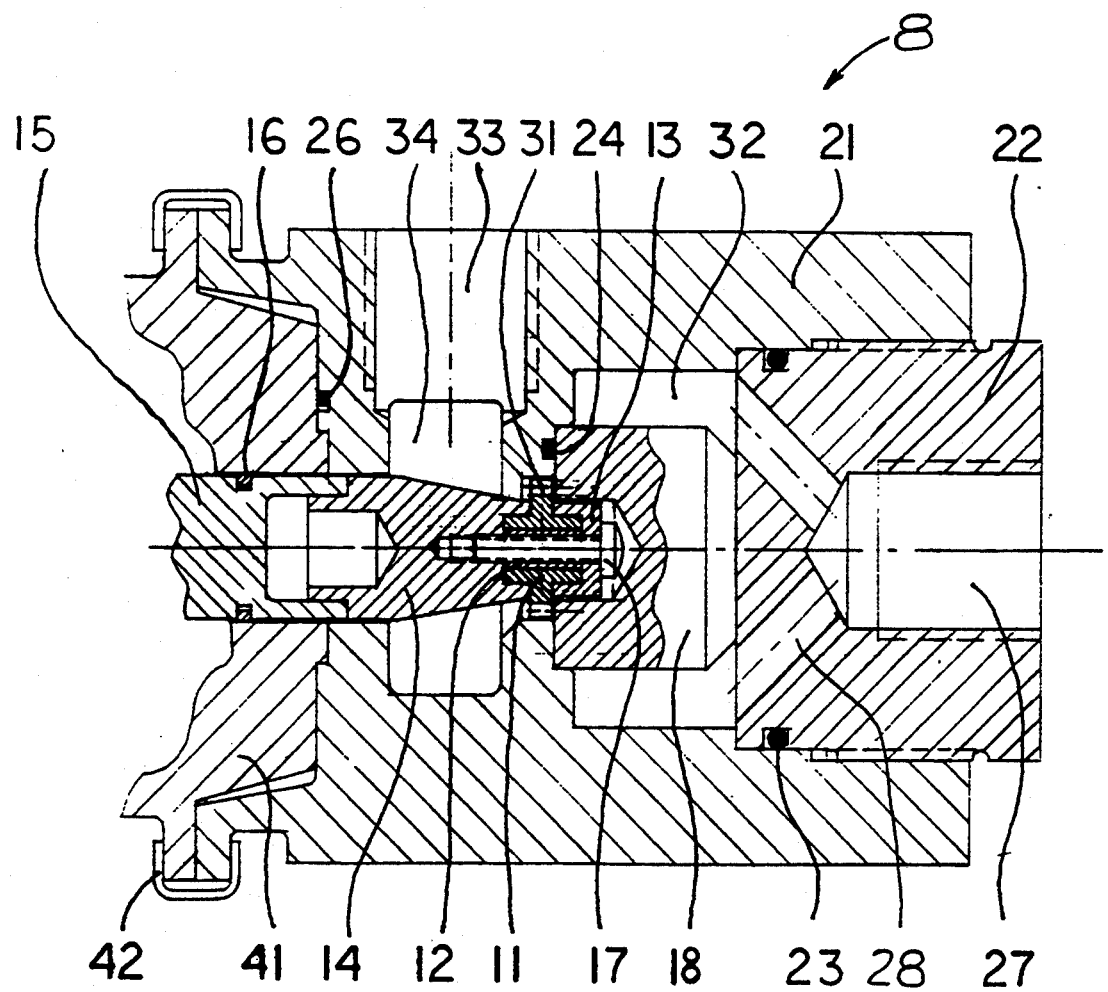
FIG. 1 is a cross sectional drawing showing a preferred embodiment of a very high speed turbine drive.

Described herein by reference to FIG. 1 is a turbine with a wheel of only 0.665 inch diameter with the capability of generating 9.6 HP at 69,750 RPM, with pressure differentials of 930 psi and having the capability of operating at the fluid temperatures of 150 to 170 degrees Fahrenheit. These fluid temperatures are achievable by cooling the hydraulic fluid with ambient air.

Turbine drive 8 includes plastic turbine wheel 11 on which are machined 28 turbine blades 31 which are an integral part of turbine wheel 11. Except for the protruding turbine blades 31, the plastic turbine wheel 11 is almost entirely contained within the cylindrical bore formed by steel shaft 14 and steel end cap 13. Tubular steel spacer 12 functions to dimensionally limit the amount of squeeze exerted by steel turbine shaft 14, steel end cap 13 and self locking steel fastener 17 which is screwed into turbine shaft 14. The volume contained between the tubular steel spacer 12, the cylindrical bore of the steel turbine shaft 14 and the cylindrical bore of the steel end cap 13 is calculated to provide a relatively low amount of compressive stress within the plastic turbine wheel 11 when assembled and a moderate amount of compressive stress within the plastic turbine wheel 11 when the turbine temperature rises to its operating temperature of approximately 170 degrees F. The torque from the plastic turbine wheel 11 is transmitted into the steel turbine shaft 14 due to friction caused by the compressive loads generated by the plastic turbine wheel 11. As shown in FIG. 1, steel turbine shaft 14 is shrink fitted into compressor shaft 15 so as to form a continuous supercharger drive shaft. Alternatively, a single solid shaft could also be utilized. At operating speeds of about 70,000 RPM, the plastic wheel is subjected to centrifugal stresses which produce hoop tension. When these tension stresses are combined with the prestressed compressive stresses the overall net stress level is still compressive. Persons skilled in the art can adjust for various levels of net stress by adjusting the length of steel spacer 12 and/or the dimensions of plastic wheel relative to the dimensions of spacer 12 and the inside diameters of the cylindrical spaces in cap 13 and shaft 14. In this preferred embodiment, to OD of the base of the plastic wheel is nominally 8.00 mm and the ID of the shaft and the end cap is nominally 8.00 mm. The length of the spacer 12 is 12.0 mm compared to a 12.02 mm length for the plastic wheel. In this configuration the plastic wheel is precooled by about 50 degrees F for easy assembly.

Turbine Parts and Its Operation

Inlet fitting 22 is threaded into turbine housing 21 holding the turbine nozzle body 18 firmly within the turbine housing 21 and providing together with rubber O-Rings 23 and 24 sealed conditions for cavity 32 which is subject to the high oil pressure. O-Ring 26 seals the turbine housing 21 against commercially supplied turbocharger housing 41. Commercially supplied sliding seal ring 16 provides the oil seal between the commercially supplied turbocharger housing 41 and the turbocharger shaft 15. A peripheral clamp 42 provides firm connection between the turbine housing 21 and the commercially supplied turbocharger housing 41.

Figure 4:
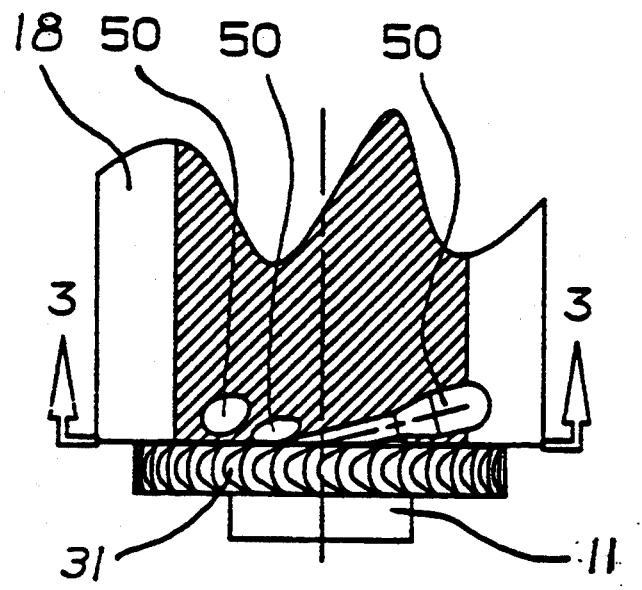
FIGS. 3 and 4 are views of the nozzle arrangement of the turbine drive shown in FIG. 1 taken along lines 3—3 and 4—4 of FIGS. 4 and 3, respectively.
Figure 3:
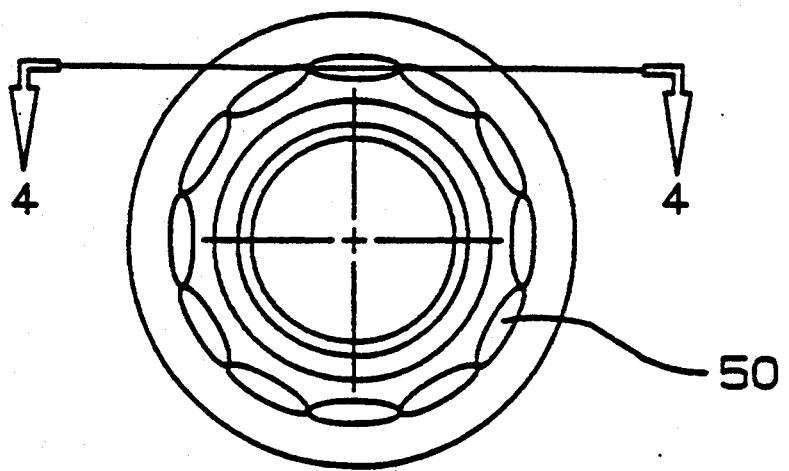

As indicated in FIGS. 3 and 4, in this embodiment 12 turbine nozzles are drilled at an angle of 15 degrees with the plane of the face of the nozzle body outlet surface. FIG. 3 shows the plan view of the exit portion of the turbine nozzles 50 as viewed in the plane 3—3 in FIG. 4. FIG. 4 shows a section through the nozzle body 16 along the plane 4—4 in FIG. 3 and combines such view with the plane view of turbine blades 19 and turbine wheel 26. High hydrodynamics efficiency of nozzle 50 in attributed to the particular combination of round cross sectioned nozzles 50 and the gradual change in the cross section of the flow area along the centerline axis of the individual nozzles 50. The turbine nozzles 50 are positioned close to each other within the nozzle body 16 so as to produce minimum wakes of low velocity fluid in between the passage areas of nozzles 50 and turbine blades 19. Such wakes are considered to be generally harmful to the turbine hydraulic efficiency. Such nozzle positioning as shown in FIG. 3 and 4 maximizes the percentage of the turbine blades frontal flow area occupied by the high velocity fluid relatively to the frontal flow area occupied by the wakes.

During operation high pressure oil (preferably at about 930 psi) enters the turbine via inlet channel 27. It flows through inlet passages 28 into cavity 32 which supplies the oil flow to the 12 nozzle passages 50 which are contained within turbine nozzle body 18. The oil flow accelerates through nozzle passages 50 converting pressure energy into kinetic energy which is then utilized to provide a driving force to the plastic turbine blades 31. Oil exits from the plastic turbine blades 31 into exit cavity 34 and is discharged at low pressure through exit channel 33.

Design Details - Three Models

The hydraulic turbine drive described herein will provide very substantial advantages in cost and performance as compared to prior art turbine drives, especially for high speed turbine drives in the 5 to 25 horsepower range. I provide in the following table design details applicable to three preferred embodiments recommended for use as drives for motor vehicle superchargers.

| MODEL | 1 | 2 | 3 |
| --- | --- | --- | --- |
| Engine Power (HP) | 140 | 220 | 300 |
| Turbonetics Compressor Model | To4B S3 | To60-1 | To67 |
| Compressor Pressure Ratio | 1.52 | 1.52 | 1.52 |
| Hydraulic Turbine Power (HP) | 9.6 | 14.8 | 19.5 |
| Hydraulic Turbine Pressure (PSIG) | 930 | 1020 | 1130 |
| Hydraulic Turbine Flow (GPM) | 23.5 | 32.0 | 38.0 |
| Hydraulic Turbine Efficiency | 0.75 | 0.77 | 0.78 |
| Hydraulic Turbine Speed (RPM) | 69,750 | 64,500 | 62,500 |
| Hydraulic Turbine Wheel Dia. (mm) | 17.3 | 19.6 | 21.3 |

-continued

| MODEL | 1 | 2 | 3 |
|---|---|---|---|
| Hydraulic Turbine Blade Height (mm) | 1.45 | 1.58 | 1.65 |
| Number of Nozzles | 12 | 12 | 12 |
| Nozzle Angle (DEG.) | 15.0 | 15.0 | 15.0 |
| Rotor Blade Angle (DEG.) | 30 | 30 | 30 |
| Number of Rotor Blades | 28 | 32 | 34 |
| PLASTIC WHEEL STRESSES | | | |
| Centrifugal Disc. Stress (PSI) | 300 | 326 | 360 |
| Disc Temperature (F.) | 150 | 170 | 170 |
| Thermal Diff. Compression Stress (PSI) | 770 | 960 | 960 |
| Assembly Compression Stress (PSI) | 1238 | 1485 | 1857 |
| Total Wheel Hub Stress (PSI) | 1708 | 2119 | 2457 |
| Material Yield Strength (PSI) | 10,200 | 10,200 | 10,200 |
| Total Stress as % of Yield (%) | 16.7 | 20.7 | 24.0 |

It should be understood that the specific form of the invention illustrated and described herein is intended to be representative only, as certain changes may be made therein without departing from the clear teachings of the disclosure. There are many other uses for this turbine drive other than to drive a supercharger. Compressor units other than that of Turbonetics could be used for superchargers. Turbine wheels with diameters as low as 0.350 inch and as large as 2.0 inches could be utilized effectively under the teachings of this invention. The number of turbine blades could be increased or decreased within the range of about 12 to 40. With changes obvious to persons skilled in the art, the unit described above could be driven with other fluids such as water. Nozzle angles as small as 10 degrees and as large as 30 degrees could be used. The base of the plastic wheel could be confined and compressed within a metal containment in many other arrangements other than the one specifically described. Accordingly, reference should be made to the following appended claims in determining the full scope of the invention.

I claim:

1. A hydraulic supercharger system comprising:
   (a) a hydraulic pump,
   (b) a supercharger comprising:
      i) a high speed hydraulic turbine drive,
      ii) a compressor driven by said hydraulic turbine drive,
      iii) a shaft connecting said drive and compressor, said shaft supported by supercharger bearings
   (c) a hydraulic venturi unit defining a main inlet, an outlet and a low pressure throat section,
   (d) an expansion tank
   (e) a main hydraulic piping means providing a hydraulic circulation loop for hydraulic fluid to flow from said pump, to drive said hydraulic turbine drive, to said main inlet of said venturi unit, through said venturi unit, to said venturi outlet and back to said pump,
   (f) a supercharger bypass system comprising a controlled bypass valve and a piping means to permit a portion of said hydraulic fluid flow to bypass said supercharger turbine drive, and
   (f) a lubrication piping means providing a lubrication route for a portion of said hydraulic fluid flow from said turbine drive to said bearings to said expansion tank and to said low pressure throat section of said venturi unit.

2. A system as in claim 1 and further comprising an oil cooler located within said hydraulic circulation loop.

3. A system as in claim 1 wherein said pump is driven by a combustion engine and said compressor provides compressed air to said engine.

4. A system as in claim 1 wherein said expansion tank is pressurized by exhaust air from said compressor.

5. A system as in claim 1 wherein said expansion tank is vented to so as to maintain the tank at atmospheric pressure.

6. A system as in claim 3 and further comprising a turbocharger driven by exhaust from said engine wherein said compressed air from said supercharger is further compressed by said turbocharger.

7. A system as in claim 1 wherein said high speed axial hydraulic turbine drive comprises:
   (a) a housing;
   (b) a shaft defining a shaft axis;
   (c) a turbine nozzle body defining a turbine nozzle body outlet surface comprising a hydraulic fluid cavity and a plurality of nozzles each of said nozzles providing a passageway for hydraulic fluid to pass from said hydraulic fluid cavity to said outlet surface and defining a nozzle centerline, where each of said nozzle centerlines:
      (1) intersects said turbine body outlet surface at points of intersection on a circle defining a nozzle exit circle which circle is concentric about said shaft axis and defines a nozzle exit plane which is perpendicular to said axis and
      (2) forms an angle of about 10 to 30 degrees with said nozzle exit plane;
   (d) a metal-plastic axial flow hydraulic turbine wheel assemble comprising:
      (1) a plastic turbine wheel comprising a plurality of axial flow turbine blades on a blade circle having a diameter of less than 2.0 inches;
      (2) a metal confinement-compression means for confining under compression substantially all of said plastic turbine wheel except said plurality of turbine blades,
   said turbine wheel assembly being a integral part of, or solidly attached to, said shaft and positioned adjacent to said turbine body outlet surface such that hydraulic fluid discharged from said nozzles impinge on said blades.

8. A system as in claim 7 wherein said plastic turbine wheel defines an axial dimension and said metal confinement-compression means comprises a metal end cap and a metal spacer co-alligned with said axis, said spacer having an axial dimension very slightly smaller than axial dimension of said plastic turbine wheel.

* * * * *